United States Patent [19]

Parsons et al.

[11] Patent Number: 4,586,087
[45] Date of Patent: Apr. 29, 1986

[54] CATHODE RAY TUBE MOUNTING SYSTEM

[75] Inventors: John M. Parsons, Portsmouth, Va.; Raymond L. Smith, San Jose, Calif.; James A. Wynn, Jr., Virginia Beach, Va.

[73] Assignee: General Electric Company, Portsmouth, Va.

[21] Appl. No.: 615,642

[22] Filed: May 31, 1984

[51] Int. Cl.$^4$ .................. A04N 5/65; H04N 5/645
[52] U.S. Cl. .................... 358/246; 358/248; 220/2.1 A; 220/2.3 A
[58] Field of Search ............... 358/245, 246, 248, 249; 220/2.1 A, 2.3 A

[56] References Cited

U.S. PATENT DOCUMENTS

| | | | |
|---|---|---|---|
| 3,271,516 | 9/1966 | Damm | 358/246 |
| 3,318,999 | 5/1967 | Taylor | 358/248 |
| 3,614,519 | 10/1971 | Figlewicz | 358/248 |
| 3,651,257 | 3/1972 | Goetz, Jr. | 358/248 |
| 4,360,838 | 11/1982 | Babicz | 358/248 |

Primary Examiner—James J. Groody
Assistant Examiner—John K. Peng

[57] ABSTRACT

An improved mounting system is disclosed for a cathode ray tube. Base bracket members are supported between the tube faceplate and the tension band of the tube. The base bracket member includes an upstanding portion extending at an angle from a foot portion and includes a tee shaped structure spaced from the foot portion. The tee shaped structure is positioned through an opening in the mounting bracket member. With the mounting bracket member positioned to thus receive the tee shaped structure of the base bracket member through the opening, the mounting bracket member may be rotated relative to the base bracket member to the mounting position. In this position, one surface of the tee shaped structure is supported against a base bearing surface of the opening in the mounting bracket member, with the tee shaped structure engaging the upper surface of the base bearing arm portion of the mounting bracket member. One portion of the mounting bracket member is thus supported against the underlying tension band and the other portion of the mounting bracket member at its toe against the tube structure.

18 Claims, 14 Drawing Figures

CATHODE RAY TUBE MOUNTING SYSTEM

BACKGROUND OF THE INVENTION

This invention relates to cathode ray tubes and, more particularly, to an arrangement for mounting cathode ray tubes in a tube enclosure or cabinet.

A variety of mounting arrangements have been employed in the past for mounting cathode ray tubes in tube enclosures and tube cabinets. A mounting arrangement is disclosed in U.S. Pat. No. 3,136,850 in which a clamping means is used at each corner of the tube to clamp the tube to the cabinet frame. A part of the clamping means rests firmly on one side against a bearing member associated with the cabinet frame and, at the other side thereof, a flange on the clamping means engages a groove between the tube cap and the tube body at each corner of the tube. The clamping means is secured by fastening means so that the clamping means firmly engages the corner groove of the tube.

Another type of mounting arrangement is disclosed in U.S. Pat. No. 3,283,072. In this mounting arrangement, a catch member comprising a generally planar body is secured at its base to the cabinet at the rounded corner locations of the tube. The planar body includes an interior opening into which a peripheral portion of the rimband extends. A tab formed integrally with the planar body is flexed into position behind the rimband. As a result of the flexure of the tab and its resilient nature, the tube is resiliently urged against the cabinet.

It is also known to utilize bracket members connected to the tube body in mounting the tube within the cabinet. In such arrangements, bracket members, having a base portion and an upstanding attachment portion affixed thereto, are supported on the tube by a metal tension band. In such arrangements, the upstanding attachment portion embodies a hole or, in some instances, a slot which is coupled with bolts or similar supportive means to the cabinet to support and mount the tube in the cabinet. One such mounting arrangement is disclosed in U.S. Pat. No. 4,210,935. According to this patent, a generally L-shaped bracket member having a base portion and an upstanding portion is positionally located at each of the corners of the tube in contact with the rimband which lies on the tube. The base portion of the bracket member is engaged by a metal tension band member extending about the tube to compressibly force the base portion of each bracket member against the rimband. The upstanding portion of each bracket member includes a slot for attaching the bracket members to the cabinet.

In one piece brackets similar to the one described immediately above, the upstanding portion has been placed on the tube so that it either is located towards the tube face or the tube back depending upon the cabinet design. It also is known to place a spacer element between the upstanding portion when it is located towards the rear of the tube but is being assembled with a cabinet that is designed for the upstanding portion being located towards the face of the tube. Such spacer elements are generally joined to the bracket by a nut and bolt or other commonly used fastening techniques.

Another technique known for mounting tubes onto cabinets is through the use of a sling arrangement. This arrangement uses a set of brackets mounted on the cabinet which hold a wire sling which is placed on the back side of the tube. The overall configuration of such tubes is such that the face or front portion has the largest cross-sectional area with the tube profile sloping towards the back of the tube in a general funnel shape. Since the sling is smaller than the size of the largest cross section of the tube, for instance, the face of the tube, it is mounted on the rear or funnel portion of the tube and pulled up tightly onto the tube under a degree of tension to hold the tube to the cabinet.

In other than sling type systems mentioned the disadvantage exists that the moment arm, the distance as measured from the top of the base portion or foot of the bracket member up to the slot or screw hole, ranges over rather large dimensions, such as in the order of from 0.4–0.6 inches. Because of this relatively large moment arm, and distance, the thicknesses of such brackets are necessarily large to support the relatively heavy larger sized tubes.

Another disadvantage with the known brackets is that the upstanding portions thereof are vulnerable to becoming bent and damaged during shipment and handling. Tubes are generally made in one location where they are assembled with the brackets and then moved to another part of the manufacturing building or shipped to another plant altogether for assembly to their cabinets. In addition, the tubes are handled as they are inserted into the cabinets for assembly thereto. Conventional brackets protrude so much that the handling and shipping of tubes can damage and bend the upstanding portions sufficiently that they need realignment or, in severe cases, replacement before installation proceeds. This is obviously time consuming and expensive.

Safety considerations require that the tube be located against the cabinet tube mask which surrounds the tube's face. If gaps exist between the tube face and mask, its possible that conducting articles could be slipped therebetween and contact components within the cabinet which bear electrical potential. Because of this consideration, the tube mounting brackets must be located within a given tolerance of positions, both radial and axial, as the tube is installed into the cabinet. Failing to stay within such tolerances creates undesirable tube/mask fit situations such as distortion, buckling, pucker, warpage, etc. of the cabinet, for instance, plastic cabinets, as the tube is installed. This in turn creates the unwanted gaps between the mask and tube face. Failing to stay within such toleranes also makes the assembly of the tube to the cabinet a more difficult and time consuming task. The vulnerability to bending and damage of the known brackets during shipment and handling aggravates these considerations. Currently, the assembler often must custom bend the upstanding portion of the brackets, use spacers such as rubber washers and apply custom torque adjustments to compensate for bent, damaged or out of tolerance brackets to provide a proper fit.

The foregoing problems are reduced or eliminated by the new bracket system as herein after described.

SUMMARY OF THE INVENTION

In accordance with the present invention, an improved system for mounting cathode ray tubes in frames, tube enclosures, cabinets, and the like is provided. The mounting system is significantly less vulnerable to damage or bending during shipment and handling. It provides a mounting scheme wherein the tube is captured and held in a captured fashion to the cabinet after installation. It also provides a mounting technique in which potential deviations from positional tolerances, both axial and radial are minimized thereby enabling easier installation of the tube to the cabinet and reduction of the possibility of gaps occurring between the tube and mask.

The mounting system, according to the present invention, incorporates base bracket members mounted in any convenient manner to the tube. In one embodiment, the base bracket members are mounted at the corners of the tube under a tension band. The tension band, which extends about the tube, engages the foot portion of the base bracket member to firmly support the base bracket member at the tube corner. The base bracket member includes an upstanding-tee shaped structure extending at an angle from the foot portion.

A mounting bracket member having an upstanding frame mounting portion is operatively associated with the base bracket member by means of an opening in the base bearing arm portion of the mounting bracket member. The arm portion is adapted to receive the tee shaped structure when in a tee receiving position and includes a base bearing surface along one portion of the opening. The opening in one position admits the tee shaped structure of the base bracket member into and through the opening. The mounting bracket member from this position may be rotated in relation to the base bracket member to the mounting position to support the tee shaped structure of the base bracket member against the base bearing surface, at which time the tee structure also engages the upper surface of the base bearing arm portion of the mounting bracket member.

A base bearing toe portion extends from the base bearing arm portion to engage the surface of the tube structure and to provide a force by the mounting bracket member against the tee shaped structure of the base bracket member. A combination of the tension afforded by the toe portion and a slightly forced fit between the opening in the mounting bracket member and the tee shaped structure, when in the mounting position, results in an effective arrangement for mounting the tube in a cabinet or other enclosure structure. The mounting bracket member also provides resilience to absorb the tolerances of tube, band and bracket assembly. By the cooperative arrangement between these elements, the moment arm of the upstanding portion of the base bracket member is much less than the moment arm of prior art systems.

DETAILED DESCRIPTION

Figure 1:
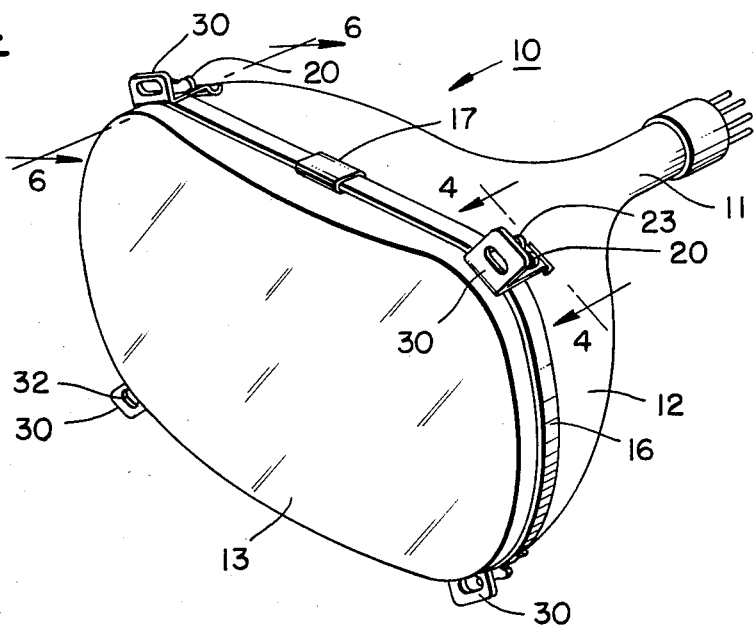
FIG. 1 is a perspective view of a novel cathode ray tube mounting system according to the present invention.

In one embodiment of the invention, as illustrated in FIG. 1 of the drawings, a cathode ray tube 10 includes a faceplate 13 having rearwardly extending skirt portions 14 and a neck 11 which extends to a flared funnel portion 12. The faceplate 13 is joined to the funnel portion 12 along the seal line 15.

The mounting system according to the present invention includes one or more base bracket members 20 which are affixed to the tube body. Base bracket member 20, in this embodiment, is generally L-shaped and includes a foot portion 21 and an upstanding portion 22 which extends at an angle from the foot portion 21.

Upstanding portion 22 includes a tee shaped structure 23 which is spaced from the foot portion 21. Tee shaped structure 23 may be formed with projections or ears extending therefrom or, alternatively, may be formed as cut-outs or notches in upstanding portion 22.

Figure 2:
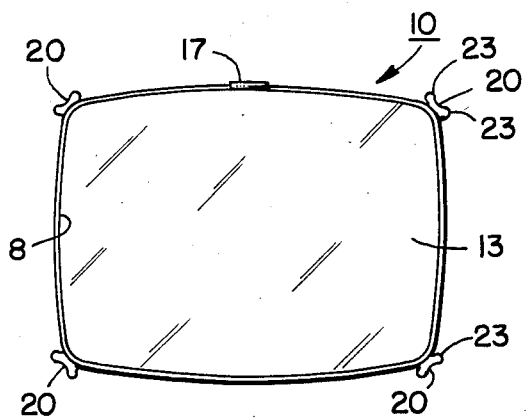
FIG. 2 is a front elevation view of a cathode ray tube illustrating the corner positioning of the base bracket members on a tube.
Figure 3:
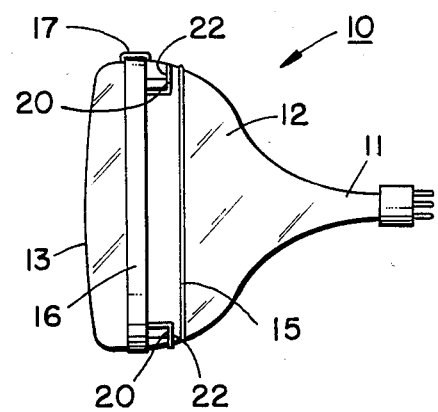
FIG. 3 is a right hand side elevation of FIG. 2.
Figure 5:
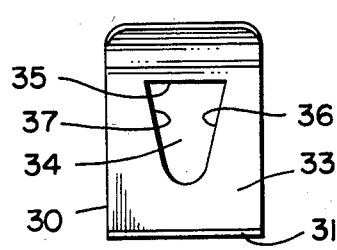
FIG. 5 is a top plan view of the mounting bracket member portion of the novel mounting system.
Figure 6:
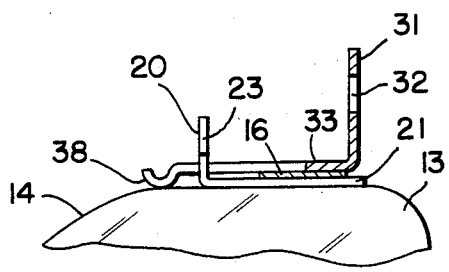
FIG. 6 is an enlarged fragmentary sectional view of a portion of the novel mounting arrangement taken along the lines 6—6 at a plane diagonally extending through the corners of the tube.

As may be seen from FIGS. 1 and 6 of the drawings, at least one base bracket member 20 may be located at the corner of faceplate 13 supported on the tube. As seen from FIG. 2 of the drawings, base bracket members 20 provide a low profile in relation to the tube surface in contrast to prior mounting arrangements. As may be seen from FIG. 3 of the drawings, the upstanding portion 22 of base bracket member 20 is located toward the rear of the skirt portion 14 of faceplate 13. It can alternatively be located toward the front portion of the face plate.

Tension band 16 extends about the tube with the foot portion 21 of base bracket member 20 being supported on the tube by tension band 16. Tension band 16 is drawn tightly about the tube and held in position by means of tension clamp 17. With this arrangement, base bracket members 20 are firmly supported between the tube and tension band 16.

Implosion-resistant members are often times used with tubes, particularly in larger size tubes. These can, for instance, comprise rim band members which extend about the skirt portion of the tube to retard crack propagation in the face plate. If a rim band is used with the present invention, it may be first placed on the tube with the base bracket member thereon and the tension band over the foot of the base bracket member.

Mounting bracket member 30 includes an upstanding mounting portion 31 which includes a mounting hole or slot 32 which is used in conjunction with bolts or other suitable fastening means (not shown) for attaching mounting bracket, with the cathode ray tube attached thereto, to the cathode ray tube enclosure. Mounting bracket member 30 includes a base bearing arm portion 33 which extends at an angle in a planar direction from upstanding mounting portion 31.

In one embodiment, upstanding mounting portion 31 and base bearing arm portion 33 are at an angle of approximately 90 degrees. Base bearing arm portion 33, near the end thereof, extends at an angle from the base bearing arm portion 33 and is curved at the ultimate end thereof to form a resilient toe 38 which serves as one support for mounting bracket 30. The assembly and operation of this configuration will hereinafter be more fully appreciated.

Located within the base bearing arm portion 33 of mounting bracket member 30 is an opening 34 for receiving the upstanding tee shaped structure 23 of base bracket member 20. Opening 34 along one portion thereof includes a base bearing surface 35. Base bearing surface 35, in this embodiment, has a configuration substantially conforming to the configuration of a surface of the upstanding portion 22 of tee shaped structure 23. The dimension of base bearing surface 35 substantially equals the dimension of upstanding portion 22 of base bracket member 20.

Surfaces 36 and 37 extend from base bearing surface 35 to a dimension which is greater than the dimension of upstanding portion 22 which includes tee shaped structure 23 and taper or narrow to a dimension at the end of opening 34 which is less than the dimension of base bearing surface 35. When this tapered arrangement is used, it provides a unique shaped opening adapted to receive the tee shaped structure 23 in one position resulting in a forced fit around the body portion 21 of upstanding portion 22 of base bracket member 20.

Mounting bracket member 30 is attached to the cathode ray tube 10 by locating the mounting bracket member 30 in a rotated position from base bracket member 20 and the mounting position to permit the tee shaped structure 23 into opening 34. In this position, opening 34 permits positioning of mounting bracket member 30 over the upstanding portion 22 of base bracket member 20 permitting the tee shaped structure 23 connected to upstanding portion 22 to project through opening 34 to the upper surface of base bearing arm portion 33.

Figure 7:
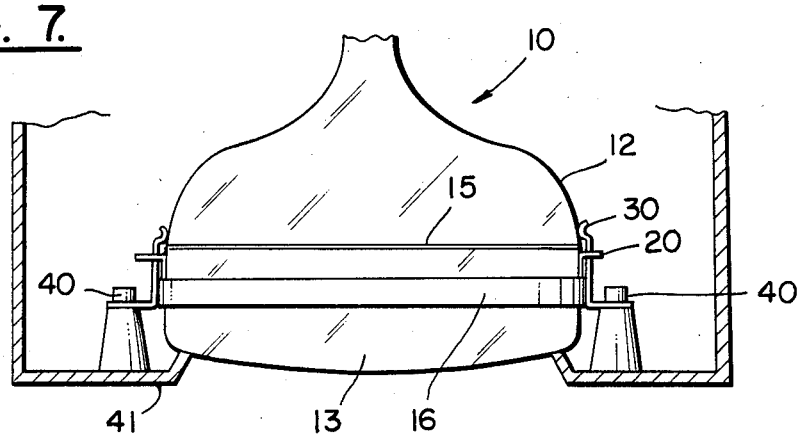
FIG. 7 is a schematic illustration of the tube installed in a cabinet with the present mounting system.

In this position, mounting bracket member 30 may be rotated relative to base bracket member 20 with the upstanding frame mounting portion 31 towards the front of cathode ray tube 10. As mounting bracket member 30 is thus rotated to the mounting position, tee shaped structure 23 engages the upper surface of base bearing arm portion 33, forcing base bearing arm portion 33 against tension band 16 on one side of upstanding portion 22 and the resilient toe 38 on the other side thereof against the tube surface. The toe rests on the tube and, preferably, bridges the frit seal 40 of the tube and rests on the funnel portion of the tube, as shown in FIG. 7. This is preferred since the use of a metal mounting bracket on top of the frit seal could cause the electrons within the tube to leak through the frit.

With surfaces 36 and 37 of opening 34 tapering to a dimension less than the dimension of upstanding portion 22 and bearing surface 35, a slight forced fit between the upstanding portion 22 of base bracket member 20 adjacent bearing surface 35 is obtained. This forced fit arrangement serves to support mounting bracket member 30 and base bearing surface 35 against upstanding portion 22 when rotated to the mounting position.

This combination provides an effective arrangement for connecting mounting bracket member 30 to base bracket member 20 and, hence, cathode ray tube 10. With this mounting system, a moment arm between mounting hole 32 and the connection to base bracket member 20 is approximately 5 times less than with prior mounting bracket arrangements. As a result, the final forces on the base bracket member 20 after it is connected with mounting bracket member 30 are toward the front of the chassis which provides a stable connection to mounting bracket member 30. In addition, the base bracket and mounting bracket members can be made of significantly thinner stock than prior known brackets, such reduction in thickness being in the order of 50%. Further, the upstanding portion of the base bracket can be made so as project only about one-third the distance that prior art mounting devices project from the tube.

Figure 8A:
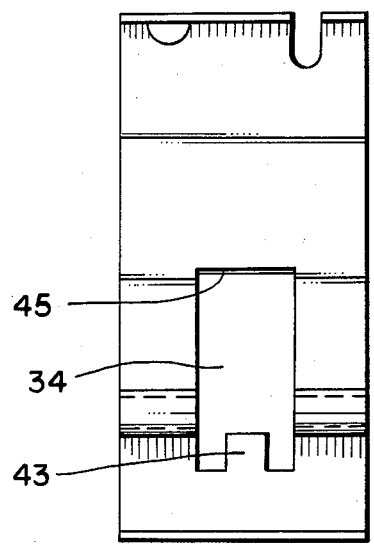
FIGS. 8a–c are top, side and end views, respectively, of a second embodiment of the mounting bracket member.
Figure 8B:
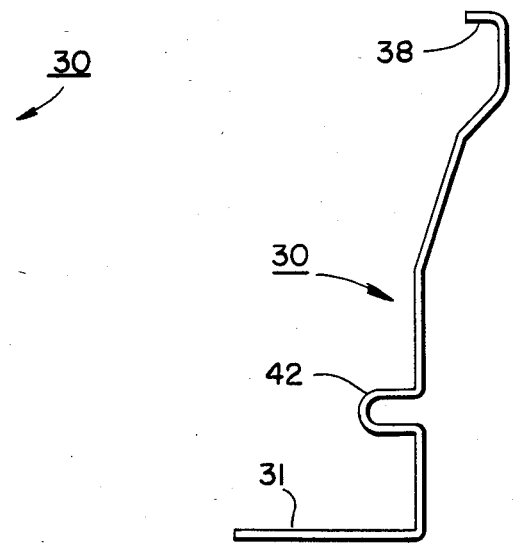
Figure 8C:
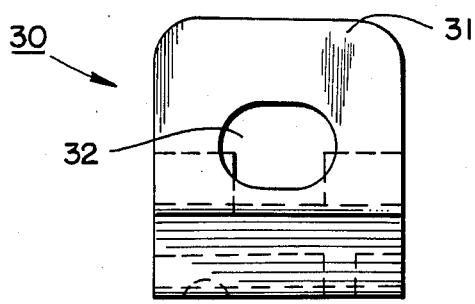

FIGS. 8a–c are top, side and end views, respectively, of a second embodiment of the mounting bracket member 30 that can be used with base bracket member 20. The mounting bracket member configuration in these figures can be made of any suitable, relatively inexpensive material such as spring steel. Bend 42 enables a spring action to occur on member 30 as it is turned into position placing toe 38 onto the tube and upstanding portion 31 onto the tension band. In this embodiment, opening 34 is rectangular in shape and has tongue portion 43, which is optional to prevent the back of the slot from getting hung up on the side of the tension band during installation of the member. Edge 45 of opening 34 is adapted to pull the tee shaped portion of the base bracket member towards the cabinet during installation.

Figure 9:
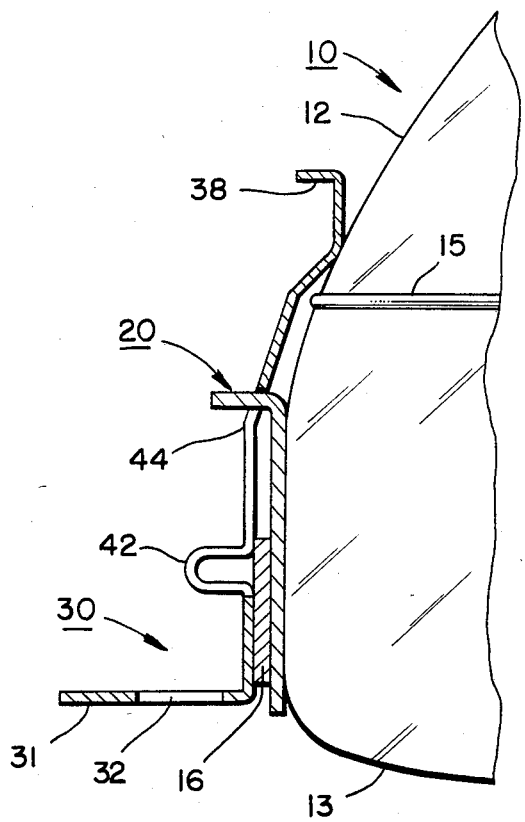
FIG. 9 is a view of the mounting system using the mounting bracket shown in FIGS. 8a–c.

FIG. 9 is a side view of the mounting member bracket shown in FIGS. 8a–c installed on the tube 10. When the mounted bracket is fully installed on the tube, toe 38 rests on funnel 12 while the upstanding portion 31 of the mounting bracket member rests on the tension band 16. In this position, there is a force placed on the mid portion 44 of the mounting bracket member by the tee portion of the base bracket member to deflect the midportion to the right in FIG. 9 towards the tube. This flexure helps retain the mounting bracket fully on the tube and tension band once installed.

To install the mounting bracket member on the base bracket member, the opening in the mounting bracket is aligned lengthwise with the tee structure 23 of the member 20 and the opening passed over the tee structure. The mounting bracket member is then rotated 90 degrees while the mounting bracket is pulled towards the front of the tube. When fully installed, the edge 45 of the mounting bracket rests against the tee structure of the base bracket and the bracket 30 is flexed in its midportion by the tee structure to lock the mounting bracket in place. To remove the bracket, the steps are simply reversed.

Figure 10A:
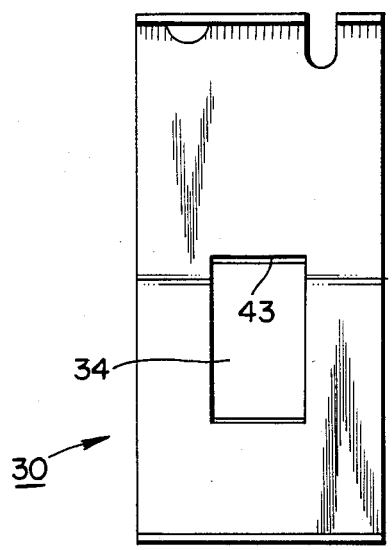
FIGS. 10a–c are top, side and end views, respectively, of a third embodiment of the mounting bracket member.
Figure 10B:
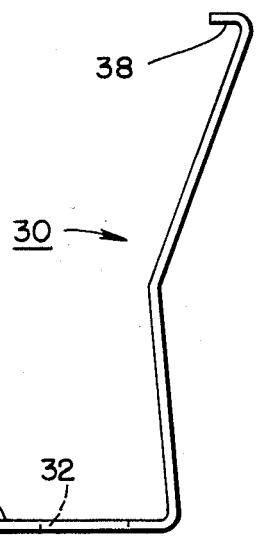
Figure 4:
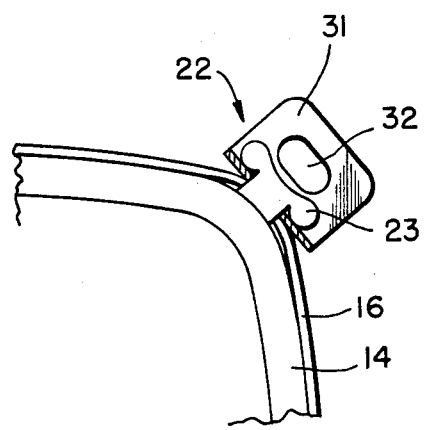
FIG. 4 is an enlarged fragmentary, vertical sectional view of a portion of the novel mounting arrangement taken along the line 4—4 in FIG. 1.
Figure 10C:
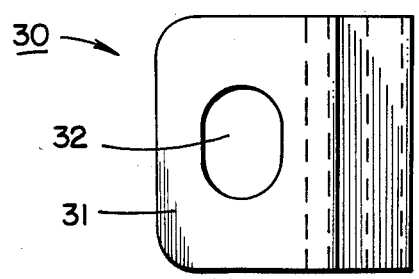

FIGS. 10a–c are top, side and end views, respectively, of a third embodiment of the mounting bracket 30. This embodiment can be made of any suitable material such as cold rolled steel. It is installed in a similar fashion as described above with the embodiment shown in FIGS. 8 and 9.

Although the mounting arrangement according to the present invention has been described in connection with three embodiments, other embodiments of the invention will occur to those skilled in the art. For example, while the mounting arrangement has been illustrated at the four corners of the cathode ray tube 10, it will be appreciated that the mounting arrangement as contemplated by the present invention can equally be applied at various points along the sides of skirt portion 14 between the corners of cathode ray tube 10. It will also be appreciated that alternate and equivalent structures to that of a tee shaped structure may be employed to support the mounting bracket member 30 on base bracket member 20. In addition, base bracket member 30 can be attached to the tube in any suitable manner. For instance, some other fastening means such as glue could be used instead of the tension band.

The two member bracket described herein is believed to perform as well as the prior art one piece devices. However, it has the additional capability to swing slightly to absorb large (±2°) radial tolerances and to stretch slightly to absorb large (±0.05") axial tolerances. Such tolerances on cathode ray tubes are historically large and must be absorbed or they can cause extreme cabinet warpage and gaps between the cabinet mask and tube. The invention enables handling of the tube and base bracket member in assembled fashion without bending or damaging the bracket. The tube can also be installed in its cabinet even in very tight situations. In addition, the intimate contact of four brackets on the tube and tension band provides a positive or absolute holding force and control on the tube in the cabinet. The tube is thereby captured by its mounting system and cannot move relative to the cabinet.

The disclosures of all the aforesaid patents are hereby incorporated by reference herein in their entireties. It should be understood that the above described embodiments of the invention are illustrative only and that modifications thereof may occur to those skilled in the art. Accordingly, this invention is not to be regarded as limited to the embodiments disclosed herein, but is to be limited only as defined by the appended claims.

We claim:

1. An improved mounting system for a cathode ray tube to a tube enclosure, comprising:
   at least one base bracket member having a foot portion attached to the tube, the said base bracket member having a tee shaped structure extending at an angle from said foot portion,
   a mounting bracket member operatively associated with the base bracket member having an opening therein adapted to receive the tee shaped structure of the base bracket member when in a tee receiving position, and adapted to be rotated to a mounting position, and
   means associated with the mounting bracket member for supporting the mounting bracket member against the tee shaped structure when the mounting bracket member is rotated from the tee receiving position to the mounting position.

2. The mounting system according to claim 1 in which the base bracket member is positioned at the corner of the cathode ray tube.

3. The mounting system according to claim 1 in which the foot portion of said base bracket member substantially conforms to the curvature of said tube at the corner thereof.

4. The mounting system according to claim 1 further including a tension band around the tube and wherein the foot portion of the base bracket member is attached to the tube by being placed between the tube and a tension band.

5. The mounting system according to claim 1 wherein the foot portion of the base bracket member is placed on the tube rimband and the tension band is placed thereover.

6. The mounting system according to claim 4 in which the mounting bracket member is supported against the tee shaped structure at one side thereof by the tension band and at the other side thereof by a resilient toe portion extending from said mounting bracket member and engaging the tube surface.

7. The mounting system according to claim 1 in which the opening has a configuration along one portion thereof substantially conforming to the configuration of a surface of said tee shaped structure to restrict movement of the mounting bracket member in relation to the base bracket member when in the mounting position.

8. The mounting system according to claim 1 in which the opening has a configuration along one portion thereof substantially conforming to the configuration of a surface of the tee shaped structure to restrict movement of said mounting bracket member in relation to the base bracket member when in the mounting position, and the opening includes tapered surfaces for engaging the opposite side of the tee shaped structure and for supporting the mounting bracket member against the tee shaped structure when in the mounting position.

9. The mounting system according to claim 1 in which the mounting bracket member includes an upstanding mounting portion and means for attaching the mounting bracket member and a thus supported cathode ray tube to the cathode ray tube enclosure.

10. The mounting system according to claim 1 in which four base bracket members are employed, one at each of the corners of the cathode ray tube.

11. An improved mounting system for a cathode ray tube to a tube enclosure in which a tension band extends about the tube, the improvement comprising:
    at least one base bracket member having a foot portion supported intermediate the tube and the tension band with the foot portion being compressed by the tension band, and having an upstanding portion extending at an angle from the foot portion and including a tee shaped structure extending at an angle from the foot portion; and
    a mounting bracket member operatively associated with the base bracket member having a base bearing arm portion with an opening therein adapted to receive the tee shaped structure of the base bracket member when in a tee receiving position, and having an upstanding mounting portion extending at an angle from the base bearing arm portion, the opening including a base bearing surface extending along one portion of the opening and having a dimension substantially equal to the dimension of the upstanding portion of the base bracket member at the tee, the opening having a dimension extending from the base bearing surface which is greater than the tee dimension to receive the tee shaped structure through the opening, the mounting bracket member having means associated with the base bearing arm portion for engaging the tee shaped structure when the mounting bracket member is rotated from the tee receiving position with the tee shaped structure extending through the opening, and means associated with the mounting bracket member for supporting the mounting bracket member against the tee shaped structure when the mounting bracket member is rotated from the tee receiving position to the mounting position.

12. The mounting system according to claim 11 in which the base bracket member is positioned at the corner of the cathode ray tube.

13. The mounting system according to claim 11 in which the base bearing arm portion of the mounting bracket member is supported against the tee shaped structure at one side thereof by the tension band and at the other side thereof by a resilient toe portion extending from the base bearing arm portion and engaging the tube surface.

14. The mounting system according to claim 11 in which the base bearing surface of the opening has a configuration substantially conforming to the configuration of a surface of the tee shaped structure to restrict movement of the mounting bracket member in relation to the base bracket member when in the mounting position.

15. The mounting system of claim 11 wherein the mounting bracket member is made of spring steel.

16. The mounting system of claim 11 wherein the mounting bracket member is made of cold rolled steel.

17. The mounting system according to claim 11 in which the upstanding mounting portion of the mounting bracket member includes means for attaching the mounting bracket member and a thus supported cathode ray tube to the cathode ray tube enclosure.

18. The mounting system according to claim 11 in which four base bracket members are employed, one at each of the corners of a rectangularly shaped cathode ray tube.

* * * * *